(12) United States Patent
Mack

(10) Patent No.: US 9,093,689 B2
(45) Date of Patent: Jul. 28, 2015

(54) BATTERY STRAPS

(75) Inventor: Robert J. Mack, Milwaukee, WI (US)

(73) Assignee: Johnson Controls Technology Company, Holland, MI (US)

( * ) Notice: Subject to any disclaimer, the term of this patent is extended or adjusted under 35 U.S.C. 154(b) by 122 days.

(21) Appl. No.: 12/999,174

(22) PCT Filed: Jun. 30, 2009

(86) PCT No.: PCT/US2009/049231
§ 371 (c)(1),
(2), (4) Date: Jan. 19, 2011

(87) PCT Pub. No.: WO2010/002874
PCT Pub. Date: Jan. 7, 2010

(65) Prior Publication Data
US 2011/0143188 A1    Jun. 16, 2011

Related U.S. Application Data

(60) Provisional application No. 61/076,948, filed on Jun. 30, 2008.

(51) Int. Cl.
*H01M 2/22* (2006.01)
*H01M 2/10* (2006.01)
*H01M 2/20* (2006.01)
*H01M 2/02* (2006.01)

(52) U.S. Cl.
CPC ............ *H01M 2/1077* (2013.01); *H01M 2/206* (2013.01); *H01M 2/0242* (2013.01)

(58) Field of Classification Search
USPC .............................................. 429/159; 3/159
See application file for complete search history.

(56) References Cited

U.S. PATENT DOCUMENTS

| 4,504,556 A | 3/1985 | Pearson |
| 4,780,379 A | 10/1988 | Puester |
| 5,283,137 A * | 2/1994 | Ching ........................... 429/175 |
| 6,023,146 A * | 2/2000 | Casale et al. .................. 320/112 |
| 7,045,236 B1 | 5/2006 | Andrew et al. |
| 2002/0098412 A1* | 7/2002 | Rodriguez et al. ............ 429/149 |

FOREIGN PATENT DOCUMENTS

| CN | 2614389 Y | 5/2004 |
| JP | 2004-031062 | 1/2004 |
| JP | 2004-178831 | 6/2004 |
| JP | 2004-265830 | 9/2004 |

(Continued)

OTHER PUBLICATIONS

Internatinoal Preliminary Report on Patentability in International Serial No. PCT/US09/049231.

(Continued)

*Primary Examiner* — Patrick Ryan
*Assistant Examiner* — Lucas J O'Donnell
(74) *Attorney, Agent, or Firm* — Boardman & Clark LLP

(57) ABSTRACT

The present disclosure relates to a battery for use in various applications including starting, lighting, and ignition and other purposes in vehicles such as automobiles and boats. The disclosed battery design includes a number of battery cell elements connected in series by a number of straps. The present disclosure describes a system of connecting the cells that minimizes the size and weight of the straps and increases the operating efficiency of the battery.

12 Claims, 4 Drawing Sheets

(56) References Cited

FOREIGN PATENT DOCUMENTS

| JP | 2004-265830 A | 9/2004 |
| JP | 2005-011602 | 1/2005 |
| WO | WO 99/36972 A1 | 7/1999 |

OTHER PUBLICATIONS

Supplemental European Search Report of the European Patent Office dated Mar. 11, 2013, EP 09774325.

* cited by examiner

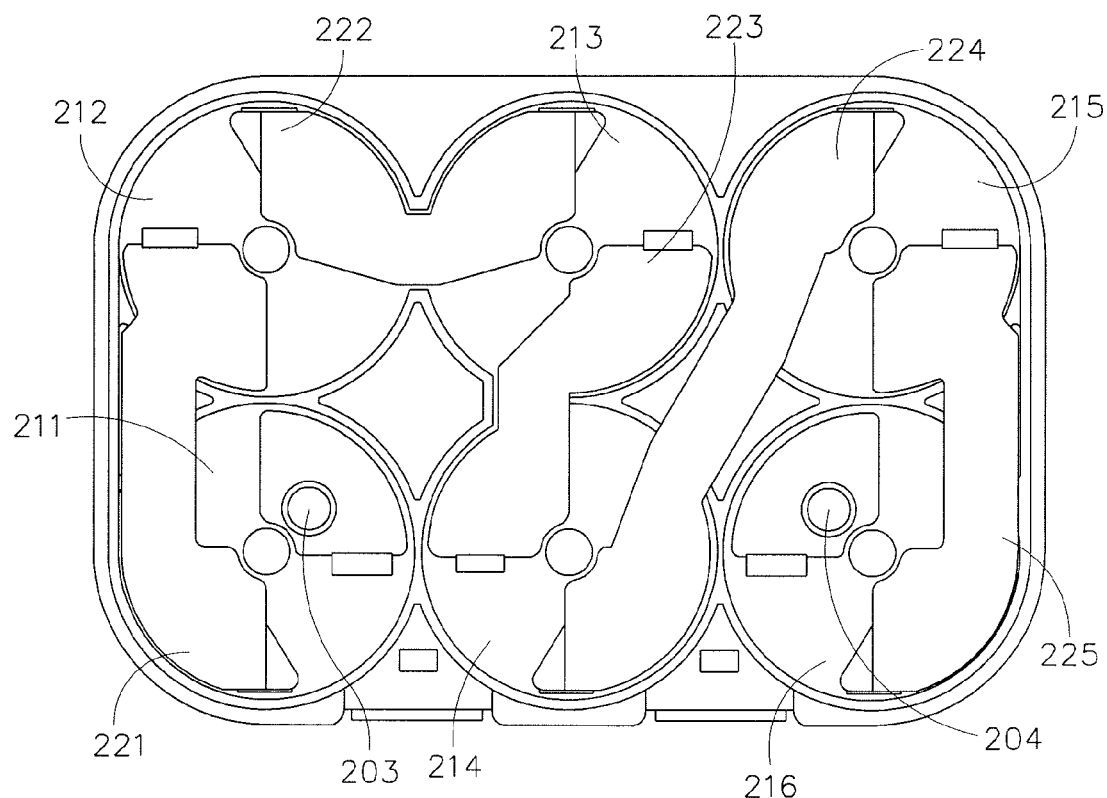
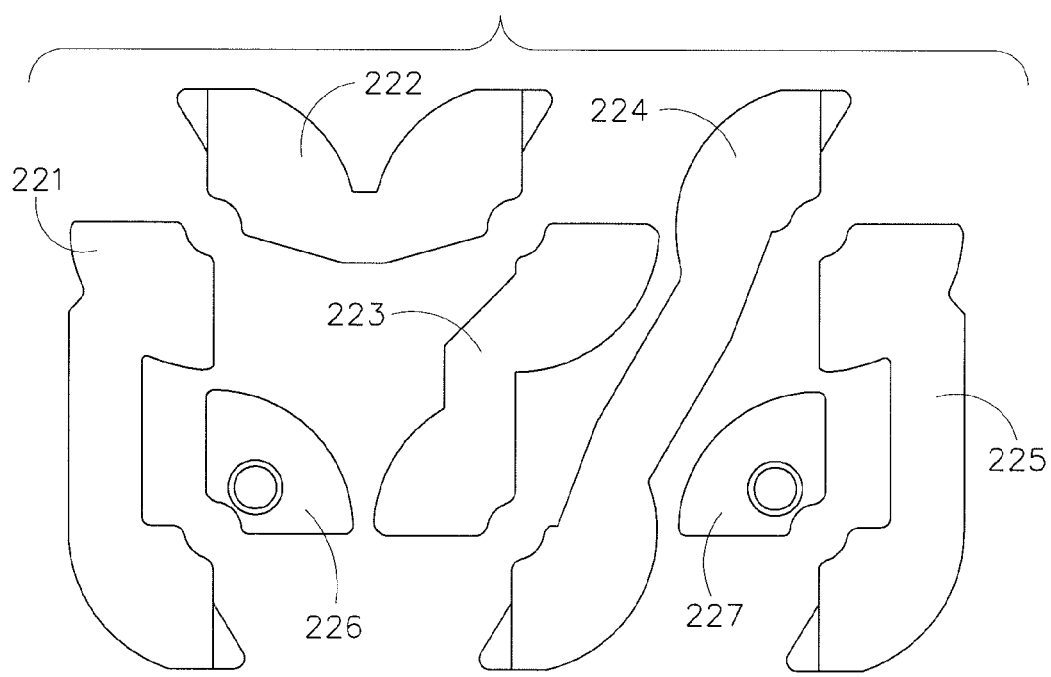

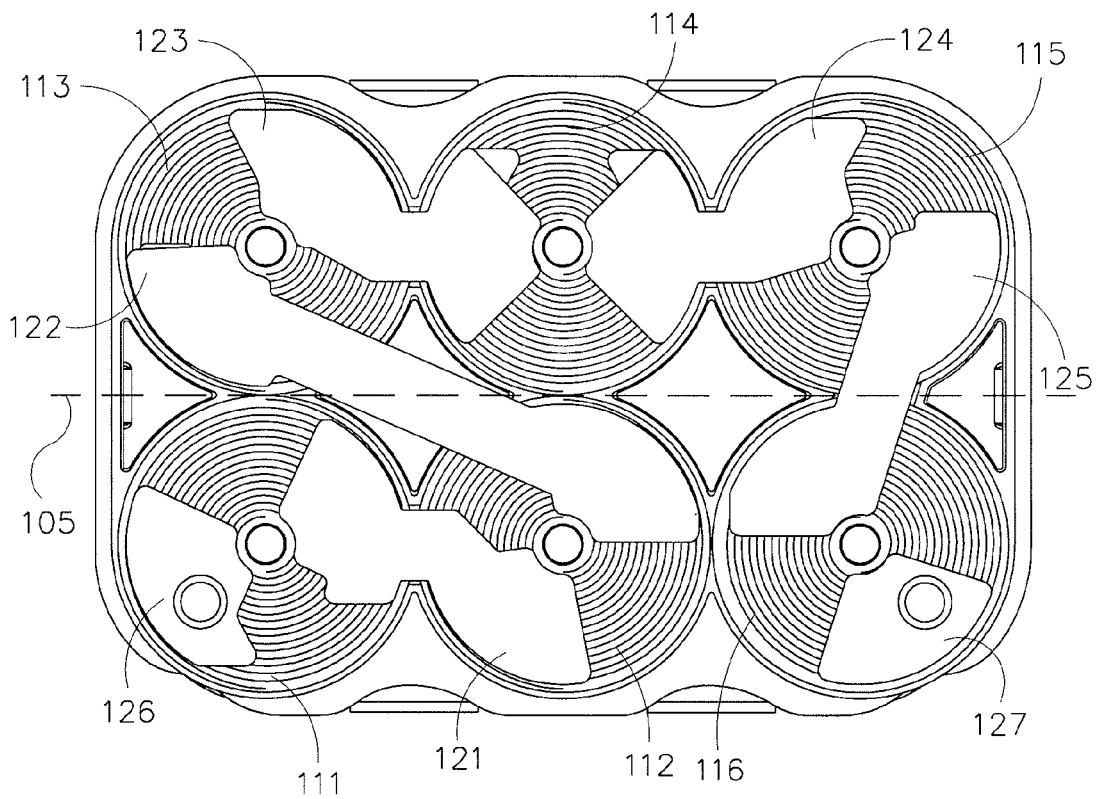
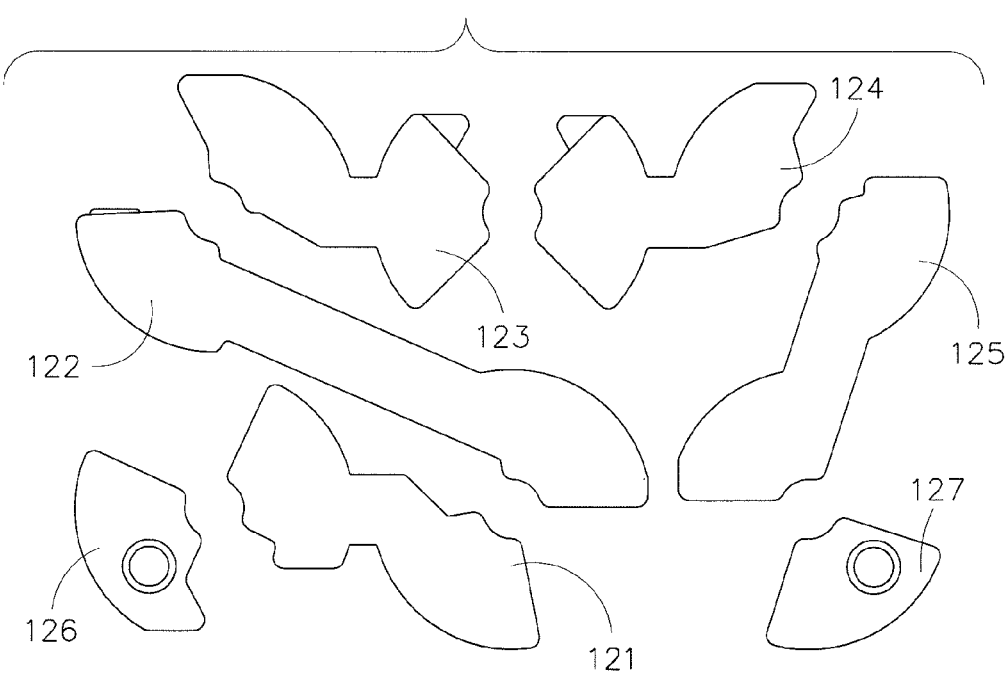

US 9,093,689 B2

BATTERY STRAPS

PRIORITY

This application claims priority to U.S. Provisional Application 61/076,948 filed Jun. 30, 2008 and International Application PCT/US2009/049231 filed Jun. 30, 2009, which are incorporated herein by reference in their entirety.

BACKGROUND

1. Field

The present disclosure relates to batteries (e.g., lead-acid batteries for use as automotive, commercial, industrial, and marine batteries in starting, lighting, and ignition ("SLI") and other applications). The present disclosure more specifically relates to batteries and internal electrical connections in batteries.

2. Related Art

It is known to provide for a battery having one or more battery cell elements in a wound configuration (e.g., spiral wound or jelly roll) that may be used for SLI and other applications. Such known batteries typically include a variety of shapes and configurations. In batteries with multiple coiled cell elements, the cells are connected in series by conductive straps requiring substantial additional material costs and weight. However, such known batteries do not realize certain advantageous features and/or combinations of features.

SUMMARY

The present invention relates to a battery comprising six battery cells in a two by three pattern with three cells located on either side of a dividing line wherein the cells are electrically coupled in series by five straps and wherein no more than two of the straps cross the dividing line.

The present invention also relates to a battery comprising a first row of three battery cells and a second row of three battery cells wherein the cells of the first row are electrically coupled in series by two battery straps and wherein the first and second cells in the second row are electrically coupled by a battery strap and wherein a strap couples one of the first or second cells in the second row is electrically coupled to a cell in the first row and wherein a strap electrically couples the third cell of the second row to a cell of the first row and wherein the battery cells are electrically coupled in series by the straps.

These and other features and advantages of various embodiments of systems and methods according to this invention are described in, or are apparent from, the following detailed description of various exemplary embodiments of various devices, structures, and/or methods according to this invention.

BRIEF DESCRIPTION OF THE DRAWINGS

Various exemplary embodiments of the systems and methods according to the present disclosure will be described in detail, with reference to the following figures, wherein:

FIG. 4 is a top view of a battery of the prior art with cover removed;

FIG. 5 is a top view of the cast-on strap shown in FIG. 4;

FIG. 6 is a top view of a battery according to an exemplary embodiment with cover removed; and FIG. 7 is a top view of the cast-on strap shown in FIG. 6.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

The present disclosure improves battery performance and/or reduces weight and cost. The present disclosure relates to a method and apparatus for connecting battery cells in series using straps with reduced overall size and electrical resistance compared to conventional battery straps. The straps and configuration thereof according to various exemplary embodiments provide a more efficient electrical path and/or use less material than conventional battery straps.

Figure 1:
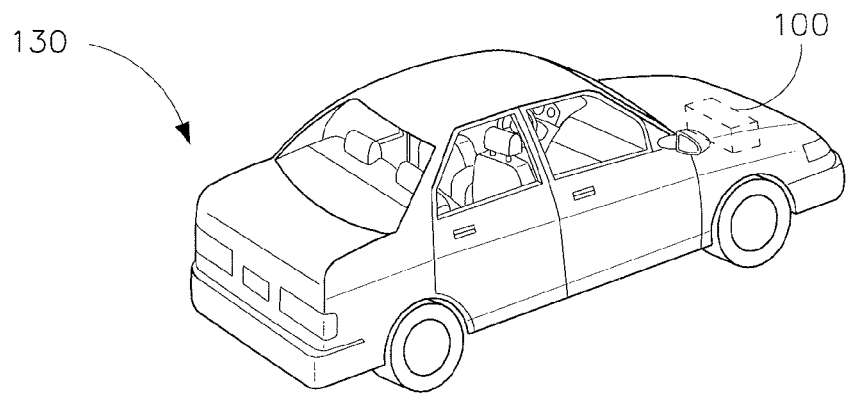
FIG. 1 is an isometric view of a vehicle including a battery according to an exemplary embodiment.

Referring to FIG. 1, a vehicle 130 is shown that includes a battery 100 according to an exemplary embodiment. While vehicle 130 is shown as an automobile, according to various alternative embodiments, the vehicle may comprise any variety of types of vehicles including, among others, motorcycles, buses, recreational vehicles, boats, and the like. According to an exemplary embodiment, vehicle 130 uses an internal combustion engine for locomotive purposes.

Battery 100 shown in FIG. 1 is configured to provide at least a portion of the power required to start or operate vehicle 100 and/or various vehicle systems (e.g., SLI). Further, it should be understood that battery 100 may be utilized in a variety of applications not involving vehicle 130, and all such applications are intended to be within the scope of the present disclosure.

The battery may include any type of secondary battery (e.g., rechargeable battery). According to an exemplary embodiment, battery 100 includes a lead-acid storage battery. Various other embodiments of lead-acid storage batteries may be either sealed (e.g., non-maintenance) or unsealed (e.g., wet).

Figure 2:
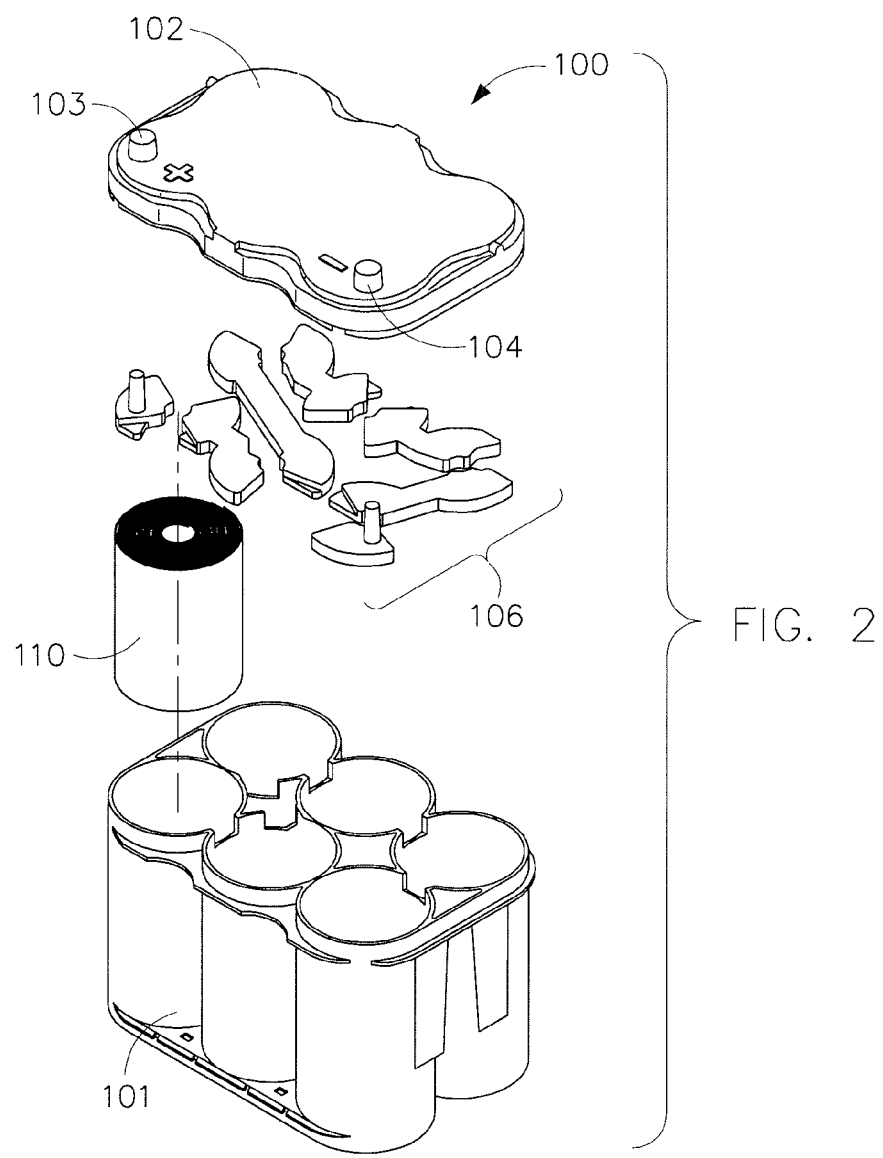
FIG. 2 is an exploded isometric view of a portion of a battery according to an exemplary embodiment.

Battery 100, according to an exemplary embodiment, is illustrated in FIG. 2. In various exemplary embodiments, battery 100 includes a cover 102 and a housing or container 101, one or more battery elements 110, straps 106, and battery terminals 103-104. In various exemplary embodiments, each battery element 110 includes a negative electrode, a positive electrode, and a separator in a wound configuration (e.g., spiral wound or jelly roll). The battery cells or elements are electrically coupled in series by straps 106 and battery terminals 103-104 are electrically coupled to the cells at each end of the series.

Figure 3:
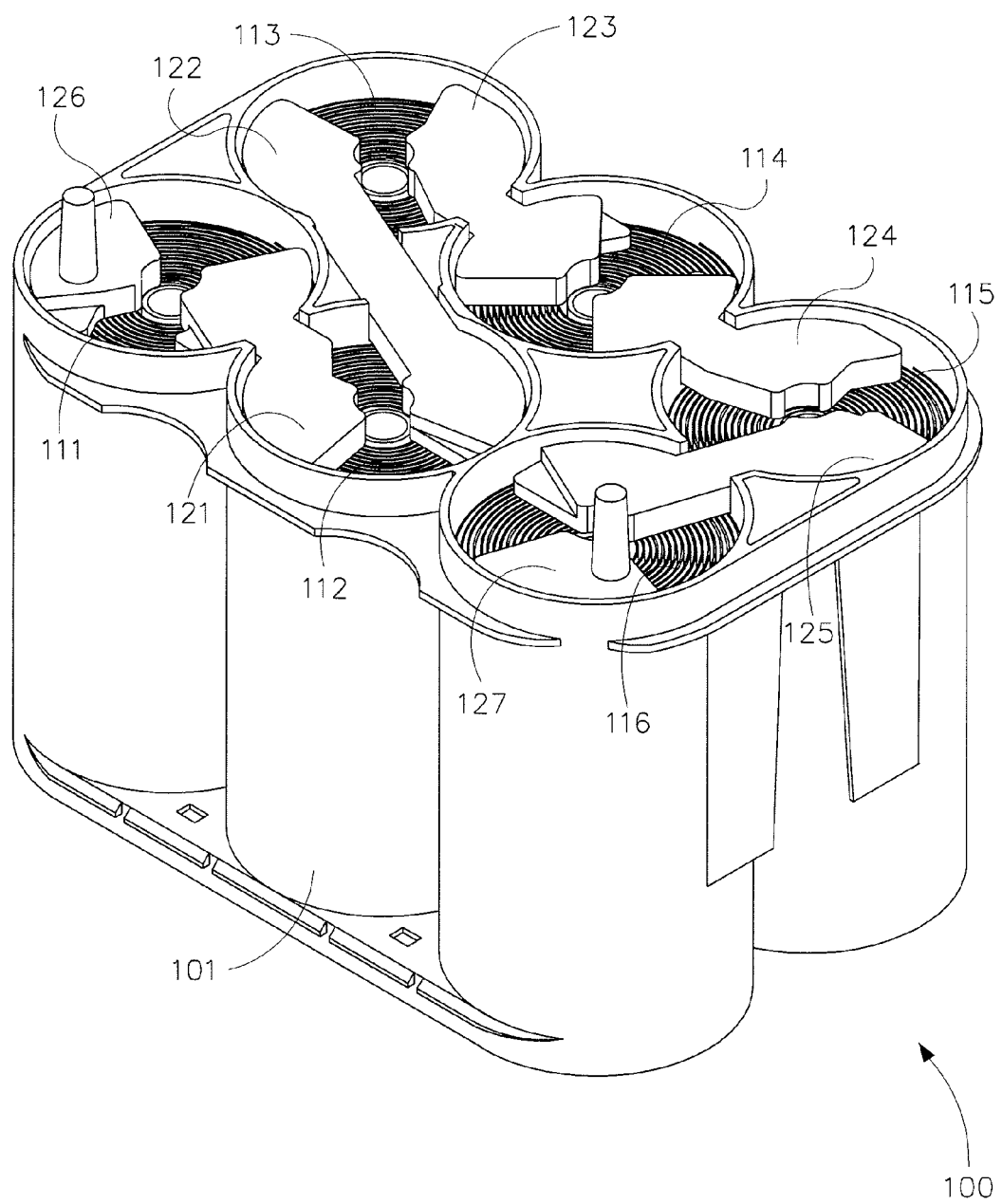
FIG. 3 is an isometric view of a battery according to an exemplary embodiment with cover removed.

Battery 100, according to an exemplary embodiment, with the cover removed, is illustrated in FIG. 3. In various embodiments, battery 100 includes several cell elements 111-116 provided in compartments defined by a container or housing 101. The illustrations provided herein relate to automotive applications, wherein six spiral wound cells are used for producing a standard automotive 12-volt battery. It will be apparent to those skilled in the art after reading this specification that the size and number of the cells used to construct a battery may vary widely, depending upon the desired end use.

In various embodiments, container 101 includes a plurality of housings or cell containers defined by one or more walls. While the figures generally illustrate a container having six cell containers or compartments, a different number of cell containers or compartments may be provided according to other exemplary embodiments. While the figures generally illustrate the cell containers arranged in a symmetrical fashion, it should be appreciated that the cell containers may be arranged in other patterns (e.g., an off-set or staggered pattern).

In various embodiments, each cell container is configured to substantially contain therein a cell element of battery 100. The cell element may be a wound cell element that includes a positive electrode, a negative electrode, and a separator such as an absorbent glass mat ("AGM") separator provided between the positive and negative electrode. In various embodiments, the electrodes and the separator are wound or wrapped in a spiral, and acid (e.g., sulfuric acid) may be provided in the cell container.

According to an exemplary embodiment, the each container or compartment has a generally cylindrical configuration. However, one or more cell containers may have other configurations (e.g., a "tapered" shape having a different diameter at one of the bottom or top of the cell container, an "hourglass" shape, etc.). One or more of the cell containers or compartments may also have features formed on the bottoms thereof (i.e. the closed ends).

In various embodiments, container 101 also includes a base. According to one exemplary embodiment, the base is integrally formed with container 101. According to another exemplary embodiment, the base is produced separately and coupled to the container.

FIG. 3 also shows cast-on-straps 121-125 which includes an elongated body portion of a length sufficient to electrically couple each turn in a coil (e.g., via lugs (not shown) extending upwardly from the coil). FIG. 2 also illustrates a cast-on-strap coupling lugs to a negative terminal. In the casting process, molten lead is poured into a mold containing a portion of the battery cell coils (e.g., the lugs) to which the lead adheres as it cools and hardens.

In various embodiments, a plurality of individual electrochemical cells or elements 111-116 are disposed within the cell containers of battery 100. In various embodiments, the elements 111-116 are preferably generally cylindrical in form. In various embodiments, elements 111-116 and the cell containers or compartments are arranged in two substantially parallel rows of three. Cell elements 111-116 are electrically coupled in series by electrically conducting straps or strap members 121-125. The terminals are electrically coupled to cell elements 111-116 by end straps 126-127. Certain channels are positioned between the cell containers or compartments to allow strap members 121-125 to be nested below the top of the container.

FIG. 4 illustrates an embodiment of a portion of prior art six-cell battery 200. FIG. 5 shows straps 221-225 from the battery of FIG. 4. The size, shape, and configuration of straps 221-225 each affects the cost/or and performance of battery 200. The cost of materials, including straps 221-225, is a significant portion of the battery's cost. Straps 221-225 also contribute to the weight of battery 200. Straps 221-225 form part of the path for internal current flow. The total path length affects total resistance and, thus, the performance of battery 200. Therefore, it would be advantageous to reduce the size and weight of straps 221-225.

FIG. 6 illustrates one exemplary configuration of strap members 121-125, end straps 126-127, cell containers, and cell elements 111-116. FIG. 7 shows the straps 121-125 from the battery of FIG. 6. As shown in FIG. 6, a first strap 121 electrically couples a first element 111 to a second element 112, a second strap member 122 electrically couples second element 112 to a third element 113, a third strap member 123 electrically couples third element 113 to a fourth element 114, a fourth strap member 124 electrically couples fourth element 114 to a fifth element 115, and a fifth strap member 125 electrically couples fifth element 115 to a sixth element 116. In various embodiments, a first end strap 126 electrically couples the first terminal post to first element 111 and a second end strap 127 electrically couples the second terminal post to sixth element 116.

Strap members 121-125 and end straps 126-127 may be utilized in any number of configurations. For example, strap members 121-125 may electrically couple sixth element 116 to second element 112, second element 112 to fifth element 115, fifth element 115 to fourth element 114, fourth element 114 to third element 113, and third element 113 to first element 111.

Alternatively, strap members 121-125 may connect third element 113 to fourth element 114, fourth element 114 to first element 111, first element 111 to second element 112, second element 112 to sixth element 116, and sixth element 116 to fifth element 115.

In yet another alternative embodiment, strap members 121-125 may electrically couple fifth element 115 to fourth element 114, fourth element 114 to sixth element 116, sixth element 116 to second element 112, second element 112 to first element 111, and first element 111 to third element 113.

By electrically coupling cells 111-116 in series in these or similar patterns, the overall efficiency of the battery 100 is improved and the material needed to electrically couple cells 111-116 is reduced. More specifically, the battery (e.g. configuration of strap members) illustrated in FIGS. 6-7, uses at least about 13 percent less material than the battery (e.g. configuration of strap members) illustrated in FIGS. 4-5. Furthermore, the battery (e.g. configuration of strap members) illustrated in FIGS. 6-7, performs at least about 25 percent better than the battery (e.g. configuration of strap members) illustrated in FIGS. 4-5 (performance measured in cold crank amps).

In various exemplary embodiments, as illustrated in FIG. 6, the battery 100 including six battery cells symmetrically arranged in a 2×3 pattern. In such embodiments, the battery may be seen as comprising two sections, each containing three full battery cell elements (illustrated in FIG. 6 by dividing line 105). In various exemplary embodiments, no more than two of five strap members 121-125 cross dividing line 105. For example, in the embodiment of FIG. 6, dividing line 105 is crossed by second strap member 122 and fifth strap member 125, but not by first strap member 121, third strap member 123, or fourth strap member 124. In other exemplary embodiments, such as those described above, the straps that do or do not cross dividing line 105 may differ, but no more than two straps cross dividing line 105 according to various exemplary embodiments.

In various exemplary embodiments with six cells in a 2×3 pattern, such as the embodiment of FIG. 6, each battery cell element is directly adjacent to two or three other cell elements and diagonally adjacent to one or two other cell elements (e.g., first cell element 111 is directly adjacent to second cell element 112 and third cell element 113 and diagonally adjacent to fourth cell element 114; second cell element 112 is directly adjacent to first cell element 111, fourth cell element 114, and sixth cell element 116 and diagonally adjacent to third cell element 113 and fifth cell element 115; etc.). In various exemplary embodiments, there are five battery straps with four of the battery straps electrically coupling directly adjacent cell elements and one battery strap electrically coupling diagonally adjacent cell elements. For example, in the embodiment of FIG. 6, second strap member 122 electrically couples diagonally adjacent second cell element 112 and third cell element 113 while first strap member 111 electrically couples first cell element 111 to second cell element 112, third strap member 113 electrically couples third cell element 113 to fourth cell element 114, fourth strap member 114 electrically couples fourth cell element 114 to fifth cell element 115, and fifth strap member 115 electrically couples fifth cell element 115 to sixth cell element 116. In various other exemplary embodiments, strap members other than the second strap member 112 may be used to electrically couple diagonally adjacent cell members.

In various exemplary embodiments, a first terminal post 103 and a second terminal post 104 extend from the top surface of the cover 102. In various exemplary embodiments, the first terminal post 103 and the second terminal post 104 extend from the top surface of the cover 102 and are positioned substantially near margins of the cover 102. In one exemplary embodiment, the first terminal post 103 and second terminal post 104 are positioned in areas substantially near the intersections of either the front edge or back edge (both of the terminals 103 and 104 are near the same edge) with the first end and second end.

The various elements of the battery, the battery housing, the battery cover, and the cell containers may be made of a wide variety of materials as is well known in the art. For example, the cover, container, and/or various components may be made of any polymeric (e.g., polyethylene, polypropylene, a polypropylene containing material, etc.) or composite (e.g., glass-reinforced polymer) material. For example, the container may be made of polypropylene-containing material (e.g., pure polypropylene, co-polymers comprising polypropylene, polypropylene with additives, etc.). Such polymeric material is relatively resistant to degradation caused by acid (e.g., sulfuric acid) provided within cells of the container. The terminal posts, side terminals and connection members may be made of one or more conductive materials (e.g., lead or a material containing lead).

The strap members 121-125 and end straps 126-127 may be made of one or more conductive materials (e.g., lead or a material containing lead).

In various embodiments, the container 101 includes one or more lips and/or flanges configured for coupling (e.g., heat sealing) to the cover 102. The cover 102 includes one or more terminals 103 and/or 104 that are electrically coupled or conductively coupled (e.g., post burned) to the end straps 126 and/or 127.

For shipping and/or handling purposes, the container 101 may also include one or more flanges located on an upper portion of each end of the container. The battery 100 may be lifted and/or carried by the flanges rather than the cover 102 to prevent any damage to the seal between the cover 102 and the container 101.

For purposes of fitment, the container may also include one or more footings located on the lower portion of one or both ends of the container. In addition, an adapter system may be provided to elevate the battery and improve fitment.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention, as recited in the appended claims.

It should be noted that references to relative positions (e.g., "top" and "bottom") in this description are merely used to identify various elements, as they are oriented in the figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

For the purpose of this disclosure, the term "electrically coupled" means the joining or connecting or two members directly or indirectly to one another in such a manner that electrical current may flow between the members. Such electrical connection may be stationary or movable in nature. Such electrical connection may be achieved with the two members or the two members and any additional intermediate members being integrally formed as a single unitary body with one another or with the two members or the two members and any additional intermediate members being attached to one another. Such electrical connection may be permanent in nature or may be removable or releasable in nature.

It is important to note that the construction and arrangement of the elements of the system, as shown and described in the preferred and other exemplary embodiments, is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements and/or elements shown as multiple parts may be integrally formed, the operation of interfaces may be reversed or otherwise varied, the length and/or width of the structures and/or members or connections or other elements of the system may be varied, the nature or number of adjustment positions provided between the elements may be varied, the position of elements may be reversed or otherwise varied, and the nature or number of discrete elements or positions may be altered or varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present invention. Other substitutions, modifications, changes, and omissions may be made in the design, operating conditions, and arrangement of the preferred and other exemplary embodiments without departing from the scope of the present inventions.

What is claimed is:

1. A battery comprising:
   a first, second and third battery cell provided in a first row;
   a fourth, fifth and sixth battery cell provided in a second row opposite the first row;
   a first battery strap electrically coupling the first and second battery cells;
   a second battery strap electrically coupling the second and third battery cells;
   a third battery strap electrically coupling the first and fifth battery cells;
   a fourth battery strap electrically coupling the fourth and fifth battery cells; and
   a fifth battery strap electrically coupling the sixth and third battery cells, wherein the battery straps electrically couple the battery cells of the first and second rows in series; and
   wherein the battery straps are cast on to the battery cells and are positioned below a cover for the battery.

2. The battery of claim 1 further comprising:
   a first battery terminal electrically coupled a cell at a first end of a sequence of electrically coupled cells formed by the battery straps;
   a second battery terminal electrically coupled a cell at a second end of the sequence of electrically coupled cells formed by the battery straps; and
   wherein the first terminal and second terminal are both located on the same side of a dividing line, and the first and second terminals each include an end strap, a portion of each end strap being provided adjacent to a perimeter of a battery container.

3. The battery of claim 1 wherein the battery cells and straps are contained in a housing and the terminals are located proximate to corners of a cover of the housing.

4. The battery of claim 1 wherein the battery has a front side, a back side, and two ends, each end is approximately equal to the width of two cells, the front and back sides are each approximately equal to the width of three cells, a first terminal is provided proximate to a first corner of the battery, the second terminal is provided proximate to a second corner of the battery, and the first corner and second corner are both proximate to the same side of the battery.

5. The battery of claim 1 further comprising:
   a first battery terminal electrically coupled to a cell at a first end of a sequence of electrically coupled cells formed by the battery straps;
   a second battery terminal electrically coupled to a cell at a second end of the sequence of electrically coupled cells formed by the battery straps; and
   wherein the first terminal and second terminal are located on the same side of a dividing line provided between the first row of battery cells and second row of battery cells.

6. The battery of claim 1 wherein a dividing line divides the first row of battery cells and the second row of battery cells, and no more than two of the battery straps cross the dividing line.

7. The battery of claim 1 wherein a dividing line divides the first row of battery cells and the second row of battery cells, and the third and fifth battery straps cross the dividing line.

8. A battery comprising:
   six cylindrical battery cells having a top side comprising:
   a first, second and third battery cell provided in a first row;
   a fourth, fifth and sixth battery cell provided in a second row opposite the first row;
   five battery straps comprising:
   a first battery strap electrically coupling the first and second battery cells;
   a second battery strap electrically coupling the second and third battery cells;
   a third battery strap electrically coupling the first and fifth battery cells;
   a fourth battery strap electrically coupling the fourth and fifth battery cells; and
   a fifth battery strap electrically coupling the sixth and third battery cells, wherein the battery straps electrically couple the battery cells of the first and second rows in series; and
   wherein the third strap is longer than the first, second, fourth, and fifth straps.

9. The battery of claim 8 wherein the battery has a front side, a back side, and two ends, each end is approximately equal to the width of two cells, the front and back sides are each approximately equal to the width of three cells, a first terminal is provided proximate to a first corner of the battery, a second terminal is provided proximate to a second corner of the battery, and the first corner and second corner are both proximate to the same side of the battery.

10. The battery of claim 8 wherein approximately one half of the top side of the second, third, sixth, and fourth cells are covered by battery straps.

11. The battery of claim 8 wherein more than one half of the top side of the first and fifth cell is covered by battery straps.

12. The battery of claim 1 wherein the battery cells are cylindrical.

* * * * *